Patented July 25, 1950

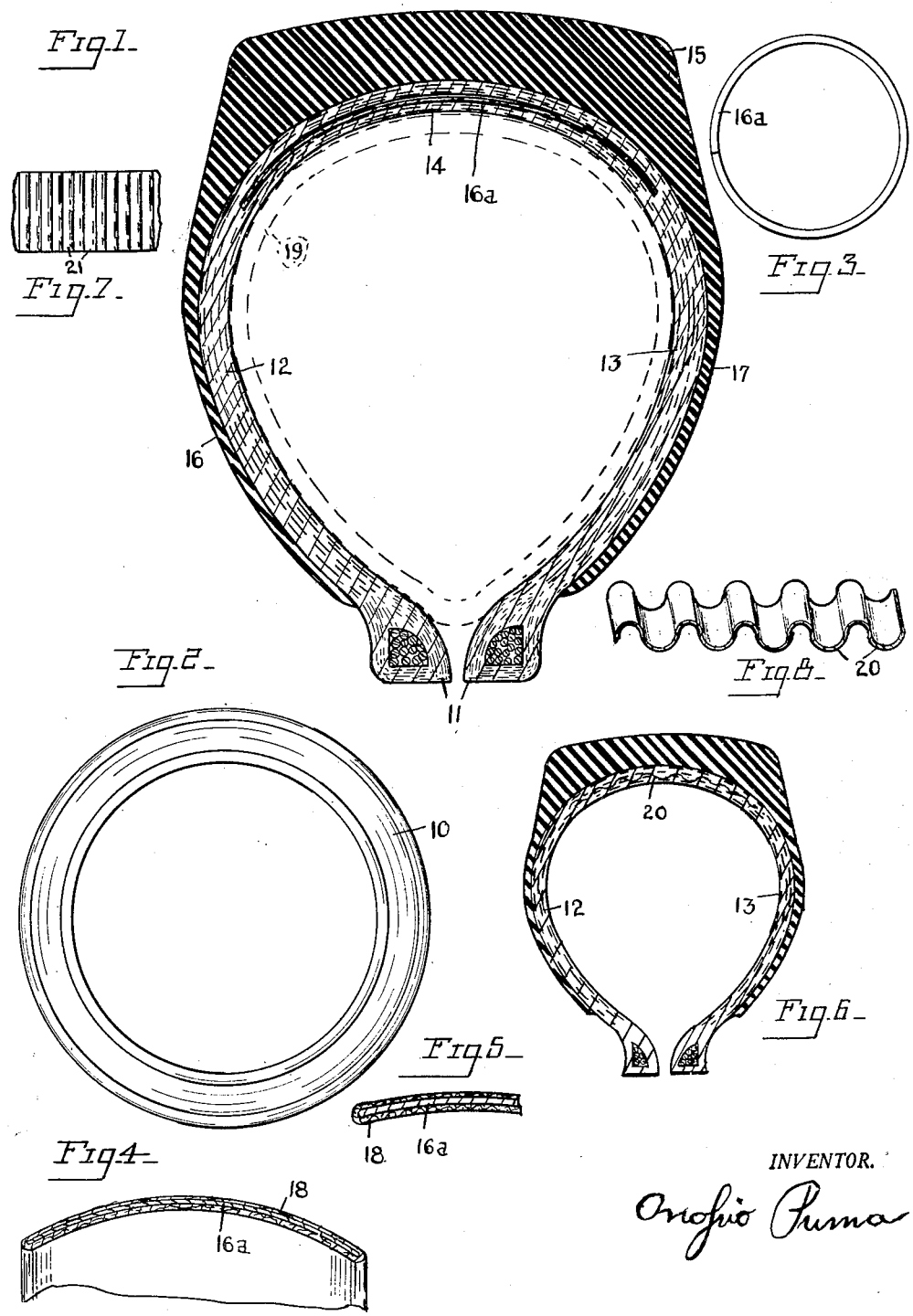

2,516,415

UNITED STATES PATENT OFFICE 2,516,415

PUNCTURE RESISTING PNEUMATIC VEHICLE TIRE

Onofrio Puma, Brooklyn, N. Y.

Application September 26, 1947, Serial No. 776,339

1 Claim. (Cl. 152—199)

The invention relates to an improved pneumatic automobile or vehicle tire, and one of the objects of the invention is to provide means enclosed by the carcass or fabric body of the tire, which will resist punctures, and thereby protect the inner tube of the tire against deflation, and thus improve or increase the safety of the tire.

Another object of the invention is to provide a pneumatic tire with a flexible band of stainless steel, which is embedded in the rubberized fabric of the tire carcass directly in the crown portion thereof, to resist and deflect any nails or sharp articles which may pierce the tread of the tire.

Another object of the invention is to provide a pneumatic vehicle tire with a flexible steel band bonded within the fabric of the crown section of the tire, by the aid of an asbestos fabric wrapping, and provided with corrugations designed to increase the flexibility of the band to changes of form due to the load displacements of the tire itself.

With the above and other objects in view, the invention relates to certain new and useful combinations, arrangements of parts, clearly described in the following specification, and fully illustrated in the drawings, in which:

Fig. 1 is a vertical sectional view through a pneumatic automobile tire, constructed in accordance with my invention.

Fig. 2 is a side elevation thereof.

Fig. 3 is a side elevation, on a reduced scale, of the puncture preventing steel band.

Fig. 4 is an enlarged detail sectional view through the steel band, showing a wrapping of textile material thereon.

Fig. 5 is another detail sectional view thereof.

Fig. 6 is a vertical sectional view through a pneumatic tire having a corrugated steel band embedded in the carcass of the tire.

Fig. 7 is a fragmentary plan view of a steel band having transverse corrugations.

Fig. 8 is a fragmentary detail view of a steel band having annular corrugations.

Referring to the accompanying drawings, which illustrate the practical embodiment of the invention, 10 designates a conventional type of carcass, having the beaded edge 11, the flexible side walls 12 and 13, the arched crown 14, the road tread 15, and the side wall layers 16 and 17, extending from the tread 15. The tread may be of any construction or design.

In the crown section of the fabric carcass a thin metal band 16a is embedded, which is lightly arched in cross section. This band is preferably made of thin steel, about twenty thousandths of an inch thick, or paper thick, which may be ten thousandths of an inch thick.

The width of the steel band is approximately that of the tread 15, and the band extends around and within the tire, and its ends are disposed in overlapping relation, as indicated in Fig. 3. The entire band is covered on both sides by the fabric strips which are built up to compose the base or foundation of the tire, or the carcass, so that the friction generated by the movement of the steel band in the tire does not act directly on the rubber tread, and is absorbed by the fabric of the carcass.

The carcass fabric is bonded by vulcanizing or by any of the welding cements now in general use, so that the steel is united effectively to the carcass. In order to improve the adhesion of the steel band to the rubberized fabric, I may wrap the steel band in asbestos fabric 18, as shown in Figs. 4 and 5, before the steel band is encased by the fabric carcass, in the usual tire making operation.

The fabric of the carcass extends about equally on both sides of the steel band, and the steel band is thus effectively spaced from the rubber tread and from the rubber inner tube 19, indicated in dotted lines, and the heat generated by the rolling of the tire is never transferred from the metal band to the inner tube or tread.

To improve the flexibility and general resiliency of the steel band, I may form annular or longitudinal corrugations 20 in the band 20', as shown in Fig. 6, or transverse corrugations 21, as shown in Figs. 7 and 8. These corrugations serve to further bond or interlock the steel band to the carcass, and also increase the ability of the steel band to yield with the tire, as it is deformed in load bearing engagement with the road, in normal traction.

I am aware that numerous attempts have been made to embed metal washers and shields in tires, but these various efforts to provide adequate protection against puncturing by nails have not been completely successful. I have discovered that a tire provided with a relatively thin and flexible steel band of, soft steel, will retain its own riding qualities, and effectively protect its inner tube against punctures due to nails and small articles capable of piercing the tread and carcass of the ordinary tire. The band is made of stainless annealed steel.

The metal plate band yields, due to its own flexibility, and the lower pressure of the rubber tire, and never offers enough resistance to allow the nail to pierce it, but deflects the point of the nail, so that its direction is changed and it is thus prevented from making contact with the inner tube of the tire.

It is understood that various changes may be made in the thickness, width, and combination of the encased steel band shown, within the scope of the invention, as defined in the claim annexed hereto.

Having described my invention I claim as new:

A pneumatic vehicle tire having a casing provided with an inner carcass composed of layers of fabric rubber bonded to each other, and a resilient rubber ground tread bonded to the outside of the carcass; an annular metal band having transversely spaced corrugations extending circumferentially through the band disposed between the layers of the fabric carcass and extending the approximate width of the tread, the annular metal band being constructed of relatively thin flexible metal and being encased by sheets of asbestos bonded thereto and wrapped around said metal band to protect said rubber bonded carcass fabric from the heat of said band during tractive rolling of said tire in service, said wrapped asbestos enclosing the side edges of the metal band, the entire metal band being enclosed by the fabric layers of said carcass and providing means for protecting an enclosed service inner tube from punctures of pointed objects driven through said tread, said corrugations providing surfaces for turning the point of a nail which penetrates the tire.

ONOFRIO PUMA.

REFERENCES CITED

The following references are of record in the file of this patent:

UNITED STATES PATENTS

| Number | Name | Date |
|---|---|---|
| 500,639 | Warner | July 4, 1893 |
| 723,366 | Clapp | Mar. 24, 1903 |
| 841,968 | Hitchcock | Jan. 22, 1907 |
| 1,168,674 | Reuter | Jan. 18, 1916 |
| 1,306,334 | Gruber | June 10, 1919 |
| 1,351,015 | Anderson et al. | Aug. 31, 1920 |
| 1,455,855 | Andrich | May 22, 1923 |